UNITED STATES PATENT OFFICE.

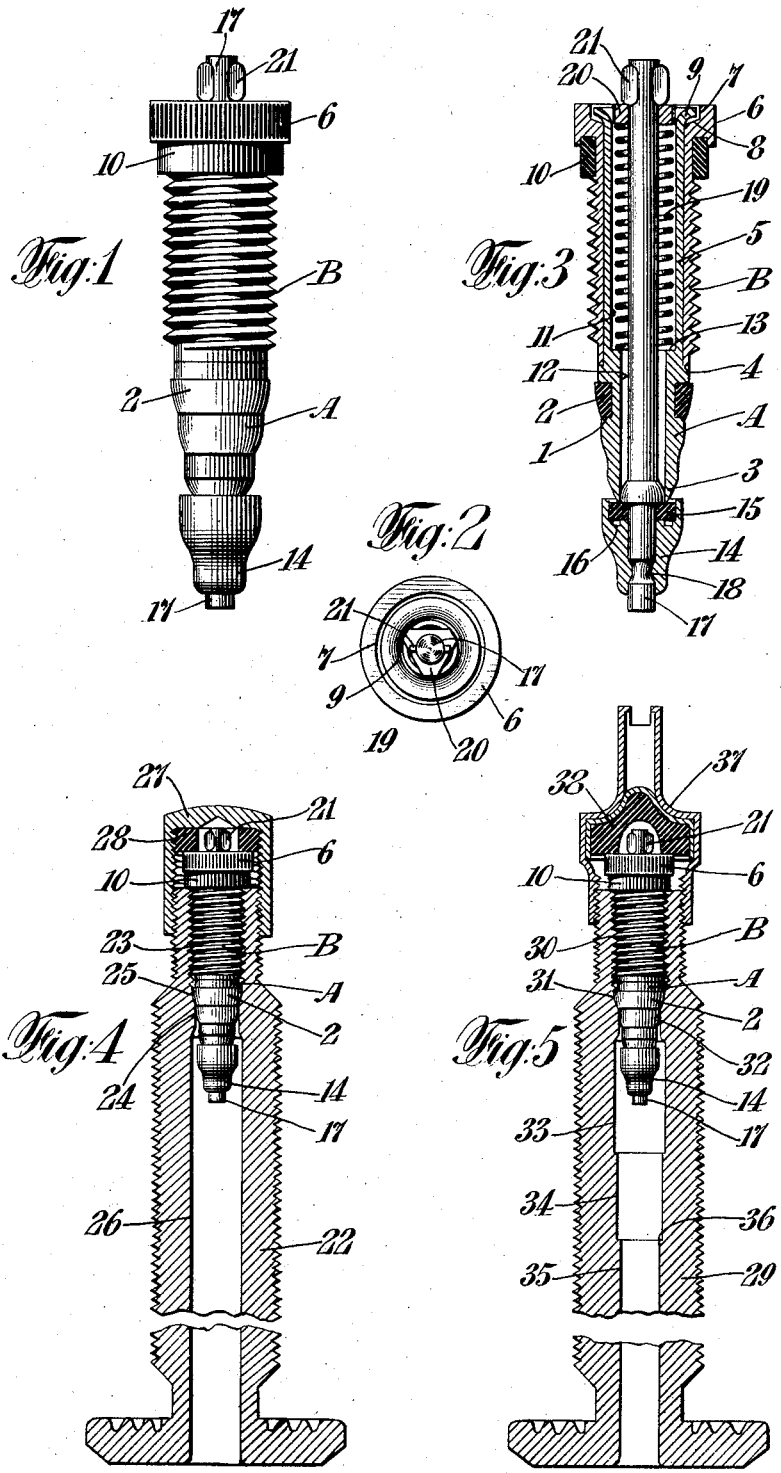

ALBERT B. NORWALK, OF NEW YORK, N. Y.

TIRE-VALVE.

1,223,344.  Specification of Letters Patent.  Patented Apr. 17, 1917.

Application filed March 21, 1916. Serial No. 85,543.

*To all whom it may concern:*

Be it known that I, ALBERT B. NORWALK, a citizen of the United States, residing in the borough of Manhattan, city of New York, in the county of New York and State of New York, have invented certain new and useful Improvements in Tire-Valves, of which the following is a specification, reference being had therein to the accompanying drawings, forming part thereof.

My invention relates to tire valves and has for its objects simplicity of construction, inexpensiveness of manufacture, convenience of use, secure sealing against leakage, reliability, durability, continued maintenance in workable condition, and housing and protection of the more delicate parts from damage. One of the important objects of my invention is to provide for the insertion and removal of the tire valve without the requirement of special tools or any tools, this advantage being attained in a construction affording a reliable seal with the tire tube by a swivel connection between a screw-threaded member and a sealing member so that a rotatable engagement may be had with the screw-threads of the tire tube without subjecting the sealing member to rotation. Other objects and advantages of my invention will hereinafter appear.

My invention includes a screw-threaded tubular swivel member, such as a tubular screw-threaded plug having a projecting knurled head engageable by the fingers, and a non-rotative sealing member joined by a swivel connection to the tubular swivel member, and a long bearing sleeve for forming such swivel connection. My invention also includes features of construction and combinations of parts as will appear from the following description.

I shall now describe the tire valve construction embodying my invention illustrated in the accompanying drawings and shall thereafter point out my invention in claims.

Figure 1 is an elevation; Fig. 2 a plan view; and Fig. 3 a central longitudinal section of a tire valve embodying my invention.

Fig. 4 is a reduced central longitudinal section of a tire tube with the tire valve appearing in elevation, and illustrates the tire valve of my invention as combined with a simple form of tire tube, the middle portion of which is omitted in this figure.

Fig. 5 is a similar view illustrating the tire valve of my invention as combined with a tire tube having special features of construction such as have heretofore been commonly employed in combination with a different valve structure requiring these special features in the tire tube.

The tire valve embodying my invention illustrated in the accompanying drawings comprises a non-rotative tubular sealing member or seat member A, and a rotative externally screw-threaded tubular plug member B swiveled to the sealing member A, these members A and B having coöperative features of construction now to be described. The tubular sealing member A has provided therein, as shown, an annular groove 1 for the reception of a packing ring 2 of suitable material, such as soft rubber, this packing ring 2 being tapered, as shown, so as to form a tight stopper-like seal within the bore of a tire tube, as will hereinafter appear. Below or inward from the sealing ring 2 the inner end of the tubular sealing member A is reduced to form a valve seat 3 for an inwardly opening check valve of suitable construction carried by the sealing member or valve tube A, as will presently appear. Above or outward from the annular groove 1 for the sealing ring 2 the tubular sealing member A is extended outward or upward and just above or outward from the groove 1 is slightly reduced in diameter so as to provide a small shoulder 4 and a long stem-like cylindrical bearing sleeve or neck 5. The tubular outwardly screw-threaded plug member B is rotatively mounted upon the bearing sleeve 5 and at its inner end abuts against the shoulder 4, as shown in the drawings, particularly in Fig. 3.

The outer end of the bearing sleeve 5 of the sealing member A is substantially coterminous with the outer end of the screw-threaded tubular swivel member or plug member B. The outer end of the tubular plug member B is adapted to project from the tire tube and is provided with a knurled head 6 at the outside of the tire tube, for direct manipulation with the fingers. At its outer end, terminating in the head 6, the tubular plug member B has its bore enlarged at 7 for a short distance inward to provide a recess forming a shoulder 8, over which the outer end of the bearing sleeve 5 is turned or upset to provide a retaining flange 9 which, together with the shoulder 4, prevents relative longitudinal movements of the parts A and B, excepting within narrow limits of play provided. It will now be apparent that the plug member B and the sealing member A are irremovably or inseparably swiveled together, so that the non-rotative tubular sealing member A is compelled to partake of both the inward and outward longitudinal movements of the plug member B. It is to be noted that the bearing sleeve or stem 5 of the tubular sealing member A is of much greater length than diameter and that it traverses or extends through from the inner end to the outer end of the tubular plug member B, thereby forming a very long swivel bearing which prevents longitudinal angular movements between the parts A and B while permitting free axial or rotative swiveling movement of these parts. Adjacent to the knurled head 6 on the screw-threaded plug B, the screw threads are shown as omitted or removed to provide a smooth portion for the reception and better accommodation of a packing ring 10 of suitable material, such as soft rubber, which is shown as seated in an annular recess formed in the adjacent face of the flange or shoulder provided by the knurled head 6, this packing ring 10 being adapted to seat upon the outer end of the tire tube and there form a second seal as will hereinafter appear.

The non-rotative tubular sealing member A, provided at its inner end, as hereinbefore described, with the valve seat 3, forms a valve-carrying valve tube for the tire valve construction of my invention, in the form in which it is illustrated in the accompanying drawings. The sealing member or valve tube A has a longitudinal bore or passage which has an outer portion 11 of larger diameter and an inner portion 12 of reduced diameter which extends through to the inner end, terminating in the valve seat 3, an inner shoulder 13 being formed in the bore, such inner shoulder 13 being shown as located a slight distance outward from the outer shoulder 4.

The inwardly opening check valve which is coöperative with the valve seat 3, comprises a cup-shaped valve head 14 which is provided with or contains a rubber sealing disk 15 which directly coöperates with the terminal valve seat 3. The bottom of the cup portion of the valve head 14 is shown as provided with an annular recess 16 which assists the sealing disk 15 in forming a good seal with the valve seat 3. The valve head 14 and its rubber sealing disk 15 are carried by a valve pin 17, the inner end of which passes through the sealing disk 15 and the valve head 14, and the valve pin or valve stem 17 is shown as provided with an annular groove 18 into which a tapered lower portion of the valve head 14 is pressed or swaged, as appears in Fig. 3, this means of forming the connection together with the quite considerable length of the valve head 14 providing a very strong construction. Just outward from the rubber sealing disk 15 the valve pin 17 is provided with an outwardly tapered enlargement, which at its base is nearly as large as the reduced bore 12, and which forms a shoulder holding the rubber sealing disk 15 in place and also forms a guide in the reduced bore 12 to assure the proper seating of the valve upon the valve seat 3. A coiled compression spring 19 assists the air pressure in closing the valve and surrounds the valve pin 17 within the larger bore 11 and acts between the internal shoulder 13 and a small triangular stop plate 20 on the outer end of the valve pin 17, this plate 20 being held in place by abutments 21 formed by pinching the valve pin 17 adjacent to its outer end, as clearly shown in the drawings. The valve pin 17 is shown as of a length so that its outer end projects a short distance beyond the outer ends of the members A and B, thereby providing for the pushing in of the valve pin 17 to unseat the valve for deflating the tire, either by means of a touch of the finger or by the usual tire gage.

The two different tire tubes illustrated in the drawings, with which the tire valve construction of my invention is equally coöperative, will now be described. In Fig. 4 there is illustrated a comparatively simple and inexpensive form of tire tube 22. At its outer end the tire tube 22 is provided with a screw-threaded socket 23 inward from which the bore of the tire tube is reduced at 24 to provide an inwardly tapered or outwardly flaring sealing face or seat 25 between the screw-threaded socket 23 and the reduced part 24 of the bore. The reduced bore 24 is of comparatively short length and inward from this the bore is slightly enlarged at 26 and thus continues, as shown in the drawings, throughout to the inner end of the tire tube 22. Excepting as to its internal construction, just described, the tire tube 22 is of a usual construction. At its outer reduced screw-threaded end the tire tube 22 is provided with a simple and inexpensive form of dust cap 27 having therein a simple annular rubber gasket 28.

A standard form of tire tube 29, heretofore extensively employed, is illustrated in Fig. 5. The two different tire tubes 22 and 29 are of similar outer or external construction. Also the standard tire tube 29 is provided with an outer screw-threaded socket 30 inward from which is a tapered sealing surface 31, and a short reduced bore 32 which is followed by a slightly enlarged bore 33, respectively similar to the socket 23, tapered sealing surface 25, reduced bore 24 and enlarged bore 26 of the hereinbefore described tire tube 22. However, in the standard tire tube 29 the bore is again reduced at 34, and inward from the reduced bore 34 the bore is again further reduced at 35 to form a shoulder 36, from which the small bore 35 continues inward to the base or inner end of the tire tube 29. The standard tire tube 29 is shown in the drawings as provided at its outer reduced screw-threaded end with its usual screw-driver form of dust cap 37, the screw-driver part of which it is necessary to insert into the outer end of the tire tube 29 for the insertion or removal therefrom of the complicated valve structure heretofore commonly employed with the tire tube 29. It is also to be noted that the special dust cap 37 is provided with a special form of rubber gasket 38.

The tire valve construction of my invention illustrated in the drawings and hereinbefore described, enters into like combination with similar features of construction of either the standard form of tire tube 29 or the simpler form of tire tube 22. Referring first to Fig. 4, illustrating the simpler tire tube 22, the knurled head 6 of the tubular screw-threaded plug member B may be rotated with the fingers without special tools or appliances to screw the tubular plug B into the internally screw-threaded socket 23 and thereby without rotation of the sealing member A or sealing ring 2, gradually to force the tapered stopper-like sealing ring 2 into a tight and secure sealing relation with the correspondingly outwardly flaring sealing surface 25 of the tire tube 22, and also at the same time the sealing ring 2 is forced into a close sealing relation with the valve tube or tubular sealing member A. The pressing in of the sealing member A without rotation preserves the rubber sealing ring 2 in good sealing condition, and rotation of the part A, as is well understood in the art, would damage the rubber sealing ring 2 so that a tight seal would not be produced at this point.

The long bearing formed by the stem-like sleeve or neck 5 of the valve tube A, by preventing angular movements longitudinally of the parts A and B, assures a direct and secure seating of the sealing ring 2 within the tapered sealing surface 25. By reason of the longitudinal rigidity of the device produced by the long sleeve swivel construction and also by reason of its finger actuation without the employment of a screw-driver or other tools, the danger heretofore present in the commonly used construction of "crossing" the screw-threads and thereby plugging up the tire tube is eliminated; also it is much easier and quicker to manipulate the device with the fingers alone than with a screw-driver. Furthermore, this extended sleeve 5 provides for the secure housing and protection of the valve spring 19 which thereby is not exposed to injury in shipment or in packing, as are the exposed springs in the hereinbefore mentioned complicated valve structure heretofore commonly employed in connection with the tire tube 29. It has been found that considerably less air pressure is required to open the valve in my improved construction than is the case in the hereinbefore mentioned commonly used complicated valve construction which the tire tube 29 of Fig. 5 is intended to accommodate, the reason for this easier working probably being due to less friction and to the better axial alinement of the several relatively moving parts in my improved construction.

It is to be noted that when the sealing ring 2 is firmly seated upon the flaring seat or sealing surface 25, the annular sealing disk 10 will be compressed by the projecting knurled head 6 upon the outer end of the tire tube 22 and will there form a second seal. This second seal will usually not be required, but may be employed if so desired. It is to be noted that the relative proportions of the parts are such that the valve seat 3 of the non-rotative tubular sealing member of valve tube A and the valve head 14 come within the bore enlargement 26 of the tire tube 22, so that plenty of free space is provided for the passage of the air around the valve head 14. The gasket 28 of the dust cap 27 seats upon and forms an outer seal with the outer surface of the knurled head 6 of the tubular plug member B, as appears in Fig. 4.

When the improved tire valve construction of my invention is applied to the usual or standard form of tire tube 29, as illustrated in Fig. 5, the valve seat 3 and valve head 14 come within the bore enlargement 33, and the tapered stopper-like rubber sealing ring 2 on the non-rotative tubular sealing member or valve tube A is pressed without rotation, into the flaring sealing surface 31 by the engagement of the screw threads of the tubular swivel nut or plug member B within the screw-threaded outer socket 30 of the tire tube 29; and also the rubber sealing ring 10, if employed, forms a second seal between the lower side or shoulder of the knurled head 6 and the outer end of the tire tube 29, the operation being substantially the same as was described in reference to the simplified tire tube 22 illustrated in Fig. 4, it being noted that a tight seal is produced merely by screwing the tubular plug member B into place with the fingers without need of using the screw-driver appliance provided upon the dust cap 37, and also when desired the tire valve may be similarly removed with the fingers from the tire tube 29. When my improved tire valve construction is employed in the standard tire tube 29, the two inner reduced bores 34 and 35, together with the shoulder 36 formed between them, do not perform any function, these additional features of construction in the tire tube being unnecessary for the employment of my improved tire valve. The gasket 38 of the dust cap 37 forms an outer seal upon the outer end of the head 6 of the tubualr plug member B, as clearly appears in Fig. 5, and similar to the outer seal of the dust cap 27 as hereinbefore described in reference to Fig. 4.

The improved tire valve construction of my invention, as illustrated in Figs. 1, 2 and 3 of the drawings, may constitute a separate and distinct article of manufacture and sale, or, on the other hand, it may be manufactured and sold in combination with either of the two different tire tubes illustrated respectively in Figs. 4 and 5 of the drawings.

It is obvious that various modifications may be made in the construction shown in the drawings and above particularly described within the principle and scope of my invention.

I claim:

1. A tire-valve construction comprising a tubular swivel member having screw-threads engageable with a tire-tube and adapted to project at all times beyond the outer end of the tire tube and providing a long inner bearing, a sealing member having a long bearing sleeve inseparably swiveled in the long inner bearing of the screw-threaded tubular swivel member and substantially coterminous with the outer end thereof, packing material on the sealing member for forming a seal within the bore of the tire-tube by longitudinal thrusting against a coöperative part of the tire-tube and adapted to be pressed into such sealing relation by the screw-threaded tubular swivel member, the sealing member being provided with a valve seat; a check valve coöperative with the valve seat, and a valve-closing spring housed within the sealing member.

2. A tire-valve construction comprising a tubular plug member having screw-threads engageable with a tire-tube, such tubular plug member providing a long inner bearing, a sealing member having a long bearing sleeve inseparably swiveled in the long inner bearing of the tubular plug member and substantially coterminous with the outer end thereof, packing material on the sealing member for forming a seal within the bore of the tire-tube by longitudinal thrusting against a coöperative part of the tire-tube and adapted to be pressed into such sealing relation by the screw-threaded tubular plug member, the sealing member being provided with a valve seat; a check valve coöperative with the valve seat, and a valve-closing spring housed within the bearing sleeve of the sealing member.

3. A tire-valve construction comprising, in combination with a tire-tube attachable to the tire and having at its outer end an internally screw-threaded enlargement of its bore forming a screw-threaded socket and having an inwardly tapered sealing surface inward from such socket, a tubular screw-threaded plug member screwing into the socket, such tubular plug member providing a long inner bearing, a tubular sealing member having a long bearing sleeve inseparably swiveled in the long inner bearing of the tubular plug member and substantially coterminous with the outer end thereof, a tapered ring of packing material on the tubular sealing member adapted to be pressed into sealing relation with the inwardly tapered sealing surface of the tire-tube by the screw-threaded tubular plug member, the tubular sealing member being provided with a valve seat; a check valve coöperative with the valve seat and a valve-closing spring housed within the bearing sleeve of the tubular sealing member.

4. A tire-valve construction comprising a tubular plug member having screw-threads engageable with a tire-tube and having an enlarged head outwardly from its threaded part and adapted to project from the tire-tube, such tubular plug member providing a long inner bearing, a tubular sealing member having a long bearing sleeve inseparably swiveled in the long inner bearing of the tubular plug member and substantially coterminous with the outer end thereof, a ring of packing material on the tubular sealing member for forming a seal within the bore of the tire-tube by longitudinal thrusting against a coöperative part of the tire-tube and adapted to be pressed into such sealing relation by the screw-threaded tubular plug member, the tubular sealing member being provided with a valve seat; a check valve coöperative with the valve seat, and a valve-closing spring housed within the bearing sleeve of the tubular sealing member.

In testimony whereof I have affixed my signature.

ALBERT B. NORWALK.